Patented Jan. 28, 1936

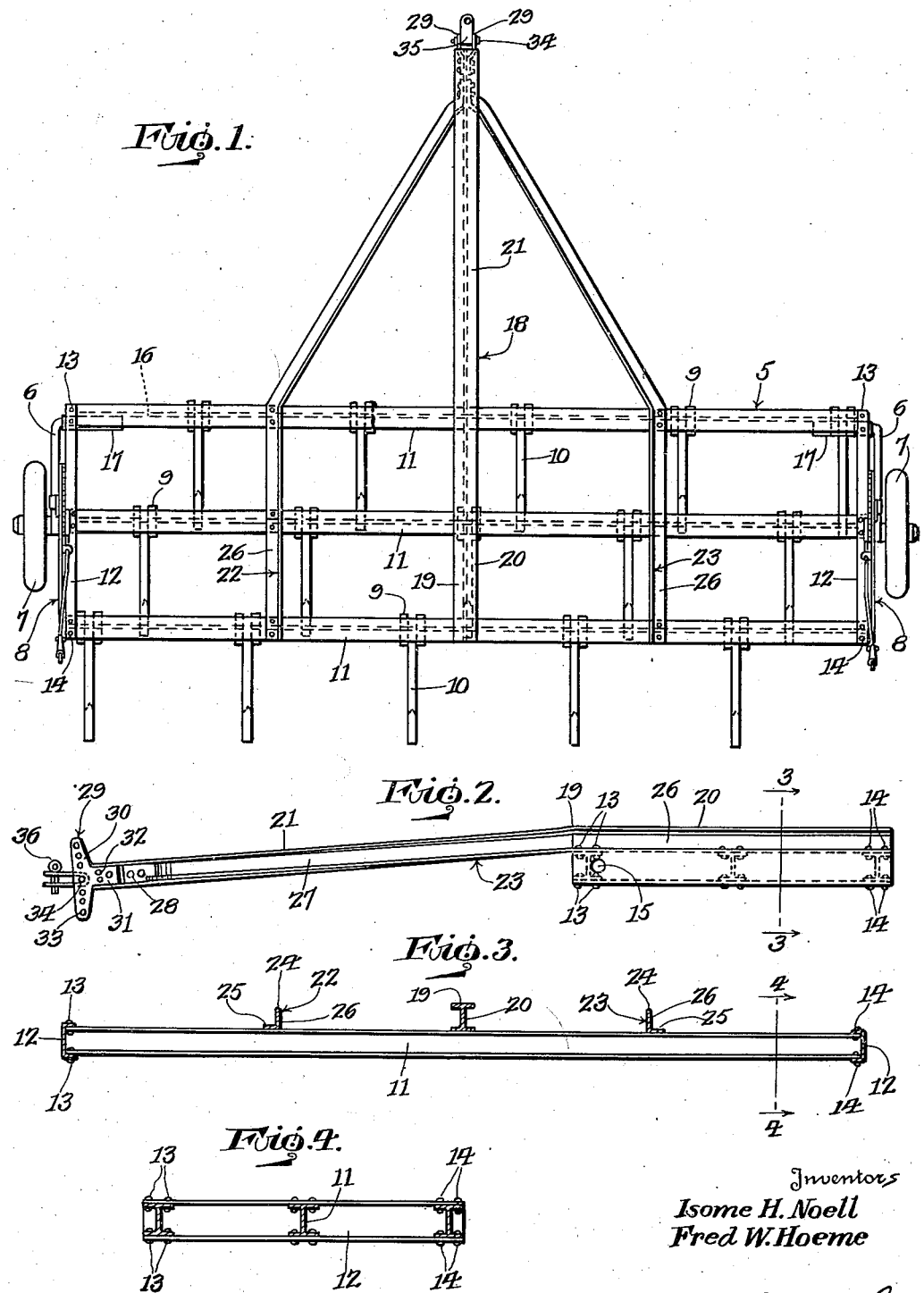

2,029,250

UNITED STATES PATENT OFFICE 2,029,250

MOBILE GROUND WORKING DEVICE

Isome H. Noell and Fred W. Hoeme, Hooker, Okla.

Original application June 1, 1935, Serial No. 24,553. Divided and this application September 3, 1935, Serial No. 39,053

2 Claims. (Cl. 97—233)

This invention relates to a mobile ground working device, such as a shovel, plow or cultivator, but more particularly to the body-part or supporting frame of the device and a combined draw-bar and brace element for said body-part, and is a division of our joint application filed June 1, 1935, Serial No. 24,553.

The object of the invention is to provide, in a manner as hereinafter set forth a mobile ground working device body-part or supporting frame having means to permit of expeditiously connecting to the bottom thereof, in spaced relation coupling elements for ground working tools.

A further object of the invention is to provide, in a manner as hereinafter set forth, a ground working device with a vertically adjustable body part or supporting frame carrying a combined draw-bar and brace element having vertically adjustable hitching means, and with said element so disposed to insure the square and rigid construction of the body-part, as well as to permit the maintaining of any level of the body part and ground working tools, with the load on the draw-bar, thus making it adjustable for high or low hitches and equalizing the height so as to not interfere with the utility of the device, as well as the load pulled behind the latter.

A further object of the invention is to provide, in a manner as hereinafter set forth a mobile ground working device body part or supporting frame having means for connecting thereto hangers for vertically adjustable rotatable suspension means therefor.

Further objects of the invention are to provide, in a manner as hereinafter set forth a structure embodying body-part or supporting frame and a combined draw-bar and brace element for a vertically adjustable mobile ground working device which is simple in its construction and arrangement, strong, durable, compact, rigid, readily assembled, thoroughly efficient in its use, and inexpensive to manufacture.

To the above ends essentially, and to others which may hereinafter appear the invention consists of such parts, and such combination of parts which fall within the scope of the invention as claimed.

In the drawing:

Figure 1 is a top plan view of a vertically adjustable mobile ground working device provided with a body-part or supporting frame and a combined draw-bar and brace element in accordance with this invention;

Figure 2 is a side elevation of the body part or supporting frame and the combined draw-bar and brace element, the elevating and lowering means for the body part or supporting frame not shown;

Figure 3 is a section on line 3—3 Figure 2; and

Figure 4 is a section on line 4—4 Figure 3.

The body-part or supporting frame of the device will be hereinafter termed a skeleton body and is generally indicated at 5. Each side of body 5 has connected to the front thereof a rearwardly extending downwardly disposed angle-shape hanger 6 carrying at its lower end a supporting wheel 7. Attached to each side of the body 5 and to a hanger 6 is a means 8 for shifting the hangers in a direction to elevate or lower the wheels 7 whereby the body 5 will be elevated or lowered with respect to the ground level. Coupled to the body 5 as at 9 are rows of spaced ground working tools 10. The construction and arrangement of the hangers, wheels, means 8, couplers for the tools 10 and the tools 10 will be as set forth in the application aforesaid.

The body 5 includes a set of spaced elongated parallel I-beams 11 of the same length and height and a pair of inwardly opening oppositely disposed channel irons 12 which overlap the ends of top and bottom faces of the I-beams 11. The channel irons 12 are anchored at their forward ends to the forward I-beam 11 by the holdfast means 13. The channel irons 12 are anchored, at their rear ends to the rear I-beam 11 by the holdfast means 14. Each channel iron in proximity to its forward end is formed with an opening 15 disposed rearwardly of and in close proximity to the web 16 of the front I-beam 11. The ends of the channel irons 12 are flush with the forward edges of the front I-beam 11 and with the rear edges of the rear I-beam 11.

Sleeves 17 extend through the openings 15, project inwardly and outwardly with respect to channel irons 12 and are anchored stationary to the web 16 in any suitable manner, preferably in a manner as set forth in the application aforesaid. The upper or forward ends of the hangers 6 are journaled in the sleeves 17.

The combined draw-bar and brace element or structure is generally indicated at 18 and it includes an I-beam 19 which constitutes a draw-bar and is formed of a straight rear stretch 20 and a downwardly inclined front or forward stretch 21 of materially greater length than stretch 20. The bottom of stretch 20 is welded or otherwise secured upon the top of body 5 at the transverse center of the latter. The length of stretch 20 is such that its front and rear ends will be flush with the front and rear edges respectively of the body 5. The element or structure 18 includes a pair of oppositely disposed bracing bars 22, 23 of angle contour and each formed of a vertical and a horizontal leg 24, 25 respectively. The legs 24 extend outwardly at right angles to the bottoms of legs 25. The bars 22, 23 are of less length and height than that of the I-beam 19. Each angle bar is formed of a straight rear stretch 26 and a downwardly and inwardly inclined forward stretch 27 of greater length than stretch 26.

The bottom of a stretch 26 is welded or otherwise secured upon the top of body 5 between the transverse center and a side edge of said body. The length of the stretches 26 is such that the front and rear ends thereof will be flush with the front and rear edges of body 5. The forward and terminal portion of the legs 25 of the stretches 27 is cut away. The forward end terminal portions of the legs 24 of the stretches 27 are arranged against opposite sides of the web of the I-beam 19 rearwardly adjacent to the forward end of the latter and are anchored to such web by the holdfast means 28.

The stretch 20 of I-beam 19 and the stretches of the bars 22, 23 constitute bracing means for insuring the square and rigid construction of the body 5, as well as preventing the twisting of the latter.

The element or structure 18 includes an adjustable hitching means carried by the forward end of I-beam 19. The said means includes a pair of spaced parallel T-shape supporting members 29, each having the head and stem indicated at 30, 31, respectively. The heads 30 are vertically disposed, extend above and depend below and oppose the forward end edge of I-beam 19. The stems 31 are arranged at opposite sides of the web of I-beam 19 and are anchored thereto by the holdfast means 32. Each head 30 is formed with a vertical row of spaced openings 33. The openings of one row in one head align with the openings of the row in the other end. The said means includes a coupling pin 34 for selectively positioning in the pairs of aligning openings and when so positioned is supported and connected by the members 29 to the I-beam 19. Extended forwardly from the members 29 and connected to the latter by the pin 34 is a clevis 35 carrying a retaining pen 36. The openings 33 in connection with the pin 34 provides for the vertical adjustment of the clevis.

The manner of setting up of the I-beam 19 and bars 22, 23, in connection with the apertured supporting members 29 and a pin 34 provide for the maintaining of any level of the body 5 and ground working tools, with the load on the draw-bar and provision is had for high or low hitches and equalizing the height so as not to interfere with the utility of the ground working device, as well as the load pulled behind the latter.

What we claim is:—

1. In a mobile ground working device a horizontally disposed skeleton body for supporting upon its top a forwardly extending draw-bar and for suspending from its bottom couplers for ground working tools, said body being formed of a set of spaced parallel I-beams arranged in tandemwise relation, a pair of oppositely disposed inwardly opening channel irons overlapping the ends of said beams, the bottom flanges of the channel irons suspending the base flanges of said beams, the base flanges of each of said beams constituting oppositely disposed means for suspending means for coupling therewith ground working tools, spaced pairs of holdfast devices extending through the flanges of the channel irons and the ends of the top and bottom flanges of said beams for fixedly securing the irons and beams together, a draw-bar having a straight rear stretch mounted upon and anchored to the top flanges of said beams centrally and transversely of said top flanges, said rear stretch having its ends flush with the front and rear of said body and bracing the latter, said draw-bar including a forwardly extending front stretch merging at its rear end into the forward end of said rear stretch and inclining downwardly throughout with respect to the front of said body, a pair of bracing bars having straight parallel spaced rear stretches anchored to the top flanges of said beams adjacent opposite sides of the rear stretch of the draw-bar, the rear stretches of said bracing bars having their ends flush with the front and rear of said body and constituting bracing means for the latter, said bracing bars having forwardly extending front stretches inclining downwardly with respect to the front of said body and inclining towards the front stretch of the draw-bar, the forward end terminal portions of the forward stretches of said bars being positioned against opposite sides of the front stretch of the draw-bar rearwardly of the forward end of the latter, and means for anchoring the forward end terminal portions of the front stretches of the bracing bars to opposite sides of the front stretch of the draw-bar.

2. In a mobile ground working device a horizontally disposed skeleton body for supporting upon its top a forwardly extending draw-bar and for suspending from its bottom couplers for ground working tools, said body being formed of a set of spaced parallel I-beams arranged in tandemwise relation, a pair of oppositely disposed inwardly opening channel irons overlapping the ends of said beams, the bottom flanges of the channel irons suspending the base flanges of said beams, the base flanges of each of said beams constituting oppositely disposed means for suspending means for coupling therewith ground working tools, spaced pairs of holdfast devices extending through the flanges of the channel irons and the ends of the top and bottom flanges of said beams for fixedly securing the irons and beams together, a draw-bar having a straight rear stretch mounted upon and anchored to the top flanges of said beams centrally and transversely of said top flanges, said rear stretch having its ends flush with the front and rear of said body and bracing the latter, said draw-bar including a forwardly extending front stretch merging at its rear end into the forward end of said rear stretch and inclining downwardly throughout with respect to the front of said body, a pair of bracing bars having straight parallel spaced rear stretches anchored to the top flanges of said beams adjacent opposite sides of the rear stretch of the draw-bar, the rear stretches of said bracing bars having their ends flush with the front and rear of said body and constituting bracing means for the latter, said bracing bars having forwardly extending front stretches inclining downwardly with respect to the front of said body and inclining towards the front stretch of the draw-bar, the forward end terminal portions of the forward stretches of said bars being positioned against opposite sides of the front stretch of the draw-bar rearwardly of the forward end of the latter, and means for anchoring the forward end terminal portions of the front stretches of the bracing bars to opposite sides of the front stretch of the draw-bar, said draw-bar being in the form of an I-beam and of greater height than said bracing bars, said bracing bars being in the form of angle irons.

ISOME H. NOELL.
FRED W. HOEME.